United States Patent [19]

Awakowicz et al.

[11] Patent Number: 4,839,921
[45] Date of Patent: Jun. 13, 1989

[54] TELEPHONE STATION COMPRISING AN OPTICAL DISPLAY DEVICE

[75] Inventors: Erwin Awakowicz, Munich; Kurt Schiller, Mering; Erwin Grassl, Munich, all of Fed. Rep. of Germany

[73] Assignee: Siemens Aktiengesellschaft, Berlin and Munich, Fed. Rep. of Germany

[21] Appl. No.: 27,429

[22] Filed: Mar. 18, 1987

[30] Foreign Application Priority Data

Apr. 21, 1986 [DE] Fed. Rep. of Germany ....... 3613416

[51] Int. Cl.$^4$ .......................... H04M 1/02; H04M 1/21
[52] U.S. Cl. .................................... 379/428; 248/27.3; 379/441; 379/447; 379/450; 379/457; 379/110
[58] Field of Search ............... 379/428, 419, 434, 441, 379/447, 450, 454, 457, 110, 53; 358/254, 248; 312/7.2; 248/224.4, 221.3, 27.3

[56] References Cited

U.S. PATENT DOCUMENTS

| 4,063,046 | 12/1977 | Schiffman et al. | 379/447 |
|---|---|---|---|
| 4,075,829 | 2/1978 | Goff | 379/447 |
| 4,227,594 | 10/1980 | Kluger | 248/27.3 |
| 4,232,196 | 11/1980 | Filippi | 379/110 |
| 4,398,073 | 8/1983 | Botz et al. | 248/27.3 |
| 4,427,243 | 1/1984 | Miller | 358/254 |
| 4,484,033 | 11/1984 | Licari | 379/447 |
| 4,577,068 | 3/1986 | Kelly et al. | 379/428 |
| 4,581,495 | 4/1986 | Geri et al. | 379/419 |
| 4,686,698 | 8/1987 | Tonmpkins et al. | 379/53 |
| 4,722,136 | 2/1988 | Justiano et al. | 248/27.3 |

FOREIGN PATENT DOCUMENTS

| 968894 | 6/1972 | Canada | 379/428 |
|---|---|---|---|
| 1249599 | 9/1967 | Fed. Rep. of Germany | 248/221.3 |
| 82G1439DE | 6/1982 | Fed. Rep. of Germany | |
| 83G1503DE | 7/1983 | Fed. Rep. of Germany | |
| 3207051 | 9/1983 | Fed. Rep. of Germany | |
| 3329493 | 9/1984 | Fed. Rep. of Germany | 379/53 |
| 60-70867 | 4/1985 | Japan | 379/110 |
| 813386 | 5/1959 | United Kingdom | 248/27.3 |

OTHER PUBLICATIONS

Klein, Peter: "Desk Top Teleconferencing", *Seimens Telecom Report*, Jan./Feb. 1987 pp. 1-6.

Minani, Toshi et al., : "New Model Video Telephone Set", Review of the Electrical Communications Laboratories, vol. 24, No. 5-6, pp. 331-340, May–June 1976.

Hansbauer, H., "Modular Telephone User Equipment Line", Teleton Report 9, Mar. 1973, Nos. 2-3, pp. 73-83.

Primary Examiner—Jin F. Ng
Assistant Examiner—Danita Byrd
Attorney, Agent, or Firm—Hill, Van Santen, Steadman & Simpson

[57] ABSTRACT

A telephone station including an optical display device fashioned as a display is provided. The display device is quickly and simply attachable by being pluggably connected to the telephone station by engagement of webs on the display device with springs in the telephone station.

5 Claims, 1 Drawing Sheet

TELEPHONE STATION COMPRISING AN OPTICAL DISPLAY DEVICE

BACKGROUND OF THE INVENTION

1. Field of the Invention

The present invention comprises a telephone station having an optical display device fashioned as a display.

2. Description of the Prior Art

Optical display devices in telephone stations are usually arranged slanted toward the user within the apparatus and indicate service features in the form of numerals or written characters. Arrangements are already known wherein multiple information are displayed on display devices of telephone stations, these display devices being arranged on the telephone station because of the multitude of possible information. These display devices are usually rigidly connected to the telephone station.

SUMMARY OF THE INVENTION

Proceeding on the basis of this latter arrangement, an object of the present invention is to provide a connection of an optical display device on a telephone station which allows a simple and fast mounting.

This object is achieved in that the display device can be plugged onto the telephone station.

As a result of such a structural design, that optical display device, adapted to the respective demands made of the performance features of the telephone station, can be attached in a simple way without requiring additional tools.

The display device can include webs connected thereto of one piece that enter into a mechanical connection with spring elements accommodated in chambers of the telephone station and accessible via passages. The electrical connections required for the connection of the display device can thereby be realized via a separate, flexible cable.

The webs can include U-shaped recesses which enter into a connection with correspondingly shaped regions in the legs of the spring element which is essentially fashioned U-shaped. In order to make it easier to read the optical display device, the webs can be arranged at an incline relative to the display surface of the display device.

In accord with a preferred embodiment, the spring element can be essentially U-shaped and can have a U-shaped bent-out portion of its base region supported against a shoulder in the chamber, whereas the legs of the spring element include U-shaped regions which cooperate with the U-shaped recesses of the webs of the display device. On the basis of angles of different sizes within the U-shaped recess in the webs of the display device and the U-shaped regions of the legs of the spring elements, there is thereby a possibility that the strength of the connection between the display device and the telephone station can be achieved; however, second, the possibility can also be selected that, given impact and shock stresses potentially exerted on the display device, this releases from the telephone station without harmful consequences and can subsequently be immediately reinserted.

BRIEF DESCRIPTION OF THE DRAWINGS

The invention shall be set forth in greater detail below with reference to an exemplary embodiment.

DESCRIPTION OF THE PREFERRED EMBODIMENTS

Figure 1:
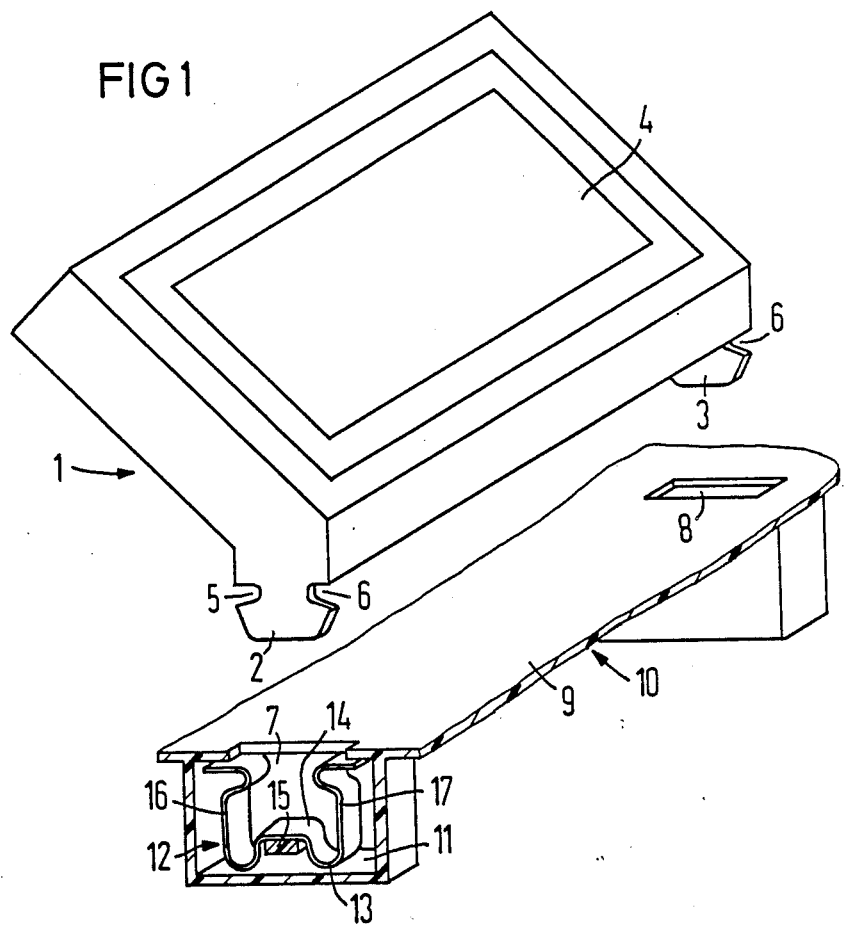
FIG. 1 is the pluggable fastening of an optical display device to a telephone station in a perspective view.

For the pluggable fastening of an optical display device fashioned as a display, two narrow webs 2 and 3 are connected thereto of one piece. These webs 2 and 3 are arranged at an angle relative to the display surface 4. The webs 2 and 3 each include approximately U-shaped recesses 5 and 6 lying opposite one another. A pair of spring elements 12 are arranged within chambers 11 accessible through a respective passage 7 and 8 in the upper housing part 9 of the telephone station 10.

The spring element 12 is essentially formed U-shaped and has a U-shaped bent-out portion 14 provided in its base 13 for securing the position of the spring 12 by pressing against a shoulder 15 in the chamber 11. Legs 16 and 17 include regions 18 and 19 bent U-shaped. In the attached condition of the display device, these regions 18 and 19 respectively engage into the U-shaped recesses 5 and 6 in the webs 2 and 3 of the optical display device 1, so that a fast and simple fastening of the display device inside the telephone station can be achieved.

Figure 2:
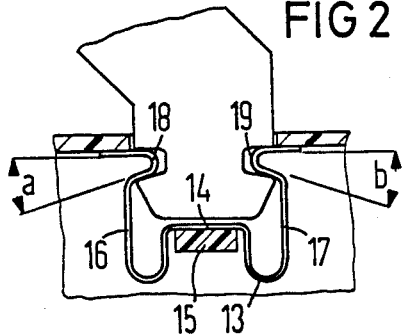
FIG. 2 is a part of the arrangement of FIG. 1 wherein the optical display device is arranged with a firm seat within the telephone station.
Figure 3:
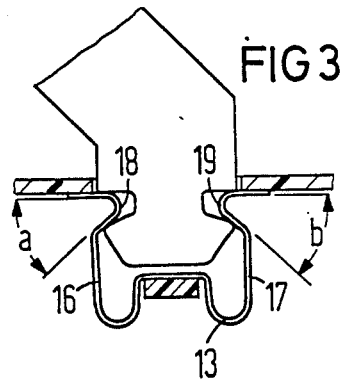
FIG. 3 is a part of the arrangement of FIG. 1 wherein the optical display device can be hinged out of the telephone station due to the effect of a blow.

There is thereby a first possibility that the display device is plugged into the telephone station with a firm seat. In this embodiment shown in FIG. 2, the angle a or, respectively, b, of the U-shaped regions 18 and 19 of the spring element 12 are dimensioned such that a taut seat of the display device in the telephone station 10 is achieved.

By enlarging the angle a or, respectively, b, of the U-shaped regions 18 and 19 of the spring element 12 and of the recesses 5 and 6 in the webs 2 and 3, a less firm connection between the display 1 and the spring element 12 can be achieved, so that the display device hinges out, for example in the direction of the arrow A, given impact or shock stresses acting on it. As a result thereof, it can subsequently be inserted again without damage to its webs 2 and 3 as well as potential damage to the wall regions of the passages 7 and 8.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A display device for a telephone station, wherein said display device is removably mounted on to a telephone station and includes one piece webs connected thereto which enter into a mechanical connection with spring elements accommodated in chambers of the telephone station, said chambers being accessible via passages.

2. A display device for a telephone station, wherein said display device includes one piece webs connected thereto including U-shaped recesses which enter into a mechanical connection with correspondingly shaped regions in leg portions of the spring elements accommodated in chambers of the telephone station, said chamber being accessible via passages and said leg portions being formed essentially U-shaped such that said display device is removably plugged onto the telephone station.

3. A display device for a telephone station, wherein said display device is removably plugged onto the telephone station, said display device includes one piece webs connected thereto which enter into a mechanical connection with spring elements accommodated in chambers of the telephone station, said chambers being accessible via passages, and wherein said webs are inclined relative to the display surface of the display device so that the display surface will be inclined relative to a support surface for the telephone station.

4. A display device wherein said display device is removably plugged onto the telephone station, said display device includes one piece webs connected thereto which enter into a mechanical connection with spring elements accommodated in chambers of the telephone station, said spring elements having a base region connecting leg portions thereof and said chambers being accessible via passages, said webs include U-shaped recesses which enter into a connection with correspondingly shaped regions in leg portions of the spring elements which are formed essentially U-shaped, and wherein each of the spring elements has a U-shaped bent-out portion in its base region supported against a shoulder in one of the chambers and the leg portions of the spring elements include U-shaped regions which cooperate with the U-shaped recesses of the webs of the display device.

5. The display device according to claim 4, wherein varying the angle of the U-shaped regions of the leg portions changes the strength of the connection between the display device and the spring element.

* * * * *